United States Patent [19]

Guest

[11] Patent Number: 4,946,213

[45] Date of Patent: Aug. 7, 1990

[54] TUBE COUPLINGS

[76] Inventor: John D. Guest, "Iona", Cannon Hill Way, Bray, Maidenhead, Bershire, United Kingdom

[21] Appl. No.: 327,310

[22] Filed: Mar. 22, 1989

[30] Foreign Application Priority Data

Mar. 25, 1988 [EP] European Pat. Off. ......... 88302711.2

[51] Int. Cl.⁵ .............................................. F16L 21/02
[52] U.S. Cl. ..................................... 285/31; 285/323; 285/93; 29/428; 29/890.14
[58] Field of Search ................... 285/31, 32, 383, 323, 285/322; 29/157 R, 428

[56] References Cited

U.S. PATENT DOCUMENTS

| | | | |
|---|---|---|---|
| 1,873,590 | 8/1932 | James | 285/383 X |
| 2,914,345 | 11/1959 | Osborn | 285/383 X |
| 3,927,451 | 12/1975 | Rogers | 285/31 X |

FOREIGN PATENT DOCUMENTS

| | | | |
|---|---|---|---|
| 878526 | 8/1979 | Belgium . | |
| 195140 | 3/1985 | European Pat. Off. . | |
| WO85/05164 | 11/1985 | PCT Int'l Appl. | 285/31 |
| 1520742 | 8/1974 | United Kingdom . | |

*Primary Examiner*—Dave W. Arola
*Attorney, Agent, or Firm*—Jeffers, Hoffman & Niewyk

[57] ABSTRACT

The disclosure relates to double ended tube coupling (10) having a coupling body (11) with the throughway (12) through which a tube can pass. Collets (16) are located in the open ends of the throughway having resilient arms to engage the tube and tapered internal cam surface (15) are formed adjacent the open ends of the throughway to engage the arms of the collets to cause the collet to lock tubes extending into the ends of the coupling body in the body. Midway along the throughway in the coupling body there are four resilient arms (25) moulded integrally with the wall of the coupling body and inclined towards one end of the coupling body to provide end stops (26) to limit the insertion of a tube into the coupling body from that one end but to permit a tube to pass through the coupling body when inserted from the other. Thus the coupling body can be slid over an end part of one tube, a second tube moved into alignment with the first tube and the coupling body then return to bridge the tubes with the end stops of the resilient arms locating the coupling body between the two tubes.

8 Claims, 2 Drawing Sheets

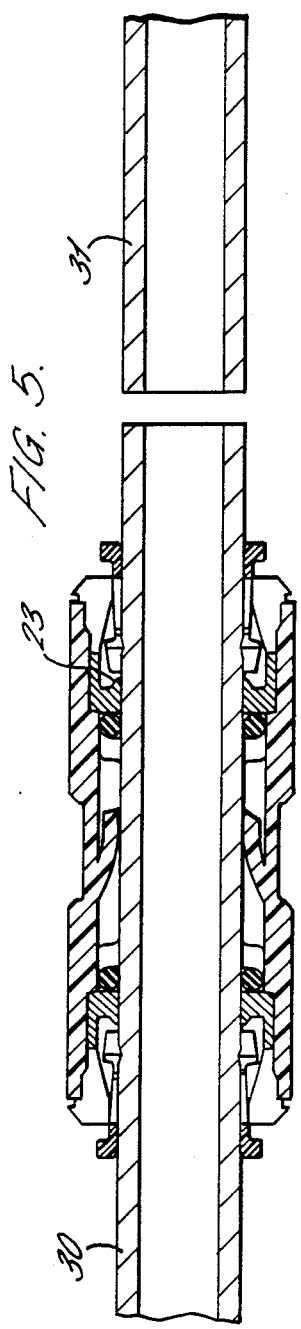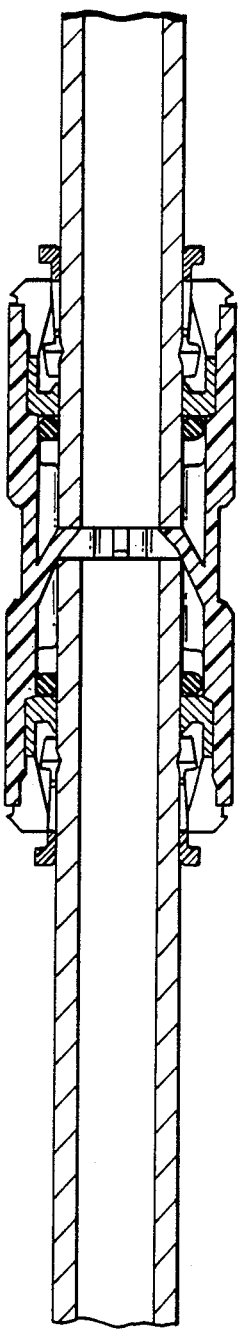
FIG. 5.
FIG. 6.

TUBE COUPLINGS

This invention relates to tube couplings and in particular to tube couplings having a coupling body with a throughway to receive a tube, a frusto-conical cam surface tapered towards one end of the throughway and a collet located in the end of the throughway having resilient fingers to engage the frusto-conical cam surface to be pressed thereby against the surface of a tube extending through the collet to lock the tube in the coupling body. Such couplings may have coupling bodies formed with throughways open at both ends and collets at both ends to receive and couple ends of two lengths of pipe together. The latter form of couplings is suitable for connecting lengths of both flexible and rigid tube together.

The object of the present invention is to provide a modified form of such tube couplings which is adapted for connecting replacement sections in a length of rigid pipe.

The invention provides a tube coupling comprising a coupling body having a throughway open at opposite ends thereof to receive tubes to be coupled to the body and to enable a tube to pass through the body, the throughway adjacent each end of the body having frusto-conical cam surfaces tapering towards the respective ends of the body, two collets disposed in the respective ends of the coupling body each having resilient arms extending axially into the throughway to engage the frusto-conical cam surfaces and to be pressed thereby against the outer surfaces of tubes passing into the throughway through the collets, and means in the throughway between said frusto-conical cam surfaces to limit the entry of a tube into the coupling body from one end whilst permitting a tube to pass through the body when inserting from the other end whereby the coupling may be used to connect together a pair of tubes by extending a first tube through the coupling body from other end, aligning the second tube adjacent to the first tube and then withdrawing the coupling body from the first tube to engage the second tube in said one end of the coupling body until second tube engages the stop means.

Preferably the stop means for limiting insertion of a tube in the coupling body from said one end are disposed midway along the throughway between the ends thereof.

More specifically the stop means comprise one or more depressable resilient detents located in the throughway and shaped to engage and stop a tube passing along the throughway from said one end of the coupling body and to be depressed to permit a tube to pass along the throughway of the coupling body from said other end.

By way of example the detents comprise one or more resilient arms extending from the wall of the throughway at an acute angle towards said one end of the throughway to engage an end of a tube inserting from that end of the coupling body to stop the tube in the body whilst permitting a tube inserted from the other end of the throughway to depress the arms outwardly to permit the tube to pass.

Thus four resilient arms are provided in the throughway at spaced locations around the throughway to provide said stop means.

In any of the above arrangements means may be provided adjacent the enlarged ends of the frusto-conical cam surfaces for engaging the three ends of the resilient arms of the collets when the collets are depressed into the ends of the coupling body to expand the ends of the collet to release the collets from a tube or tubes passing through the coupling body to facilitate sliding of the coupling body along a tube.

In the latter construction said means may comprise annular elements disposed in the throughway adjacent the frusto-conical cam surfaces and having further external frusto-conical cam surfaces thereon with which the ends of the arms of the collets are engagable to spread the arms.

The invention also provides a method of repairing a tube comprising cutting a damaged section of tube from a length of tube, preparing a new section of tube to replace the section of tube removed, sliding couplings in accordance with any of the above arrangements wholly on to the ends of the existing tube, inserting the new section of tube between the ends of the existing tube and then sliding the tube couplings over the ends of the newly installed section until the stop means in the couplings limit further movement to couple the new section to the existing tube.

The following is a description of a specific embodiment of the invention reference being made to the accompanying drawings in which:

FIGS. 5 and 6 illustrate an example of the use of the couplings.

Figure 1:
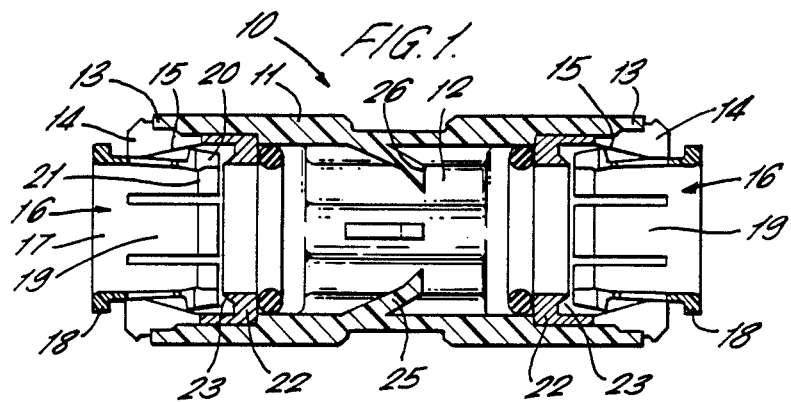
FIG. 1 is a sectional view through a tube coupling according to the invention.
Figure 2:
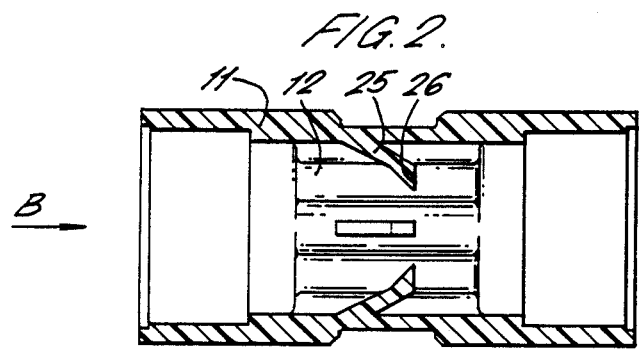
FIG. 2 is a section view through the coupling body of the coupling of FIG. 1.
Figure 3:
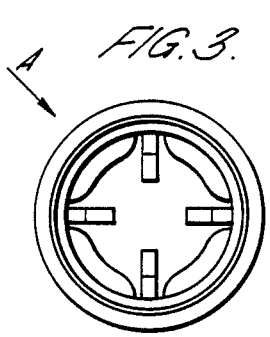
FIG. 3 is a view in the direction of the arrow B on FIG. 2.
Figure 4:
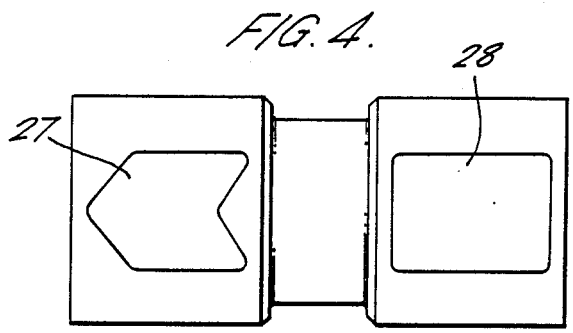
FIG. 4 is a view in the direction of the arrow A on FIG. 3.

Referring firstly to FIG. 1 of the drawings, there is shown a double ended tube coupling indicated generally at 10 comprising a coupling body 11 having a throughway 12 extending through the body the diameter of which is sufficient to pass a tube of a suitable diameter to be secured in the coupling body. The coupling body has ends 13 in which annular inserts 14 are secured. Conveniently the coupling body 11 and inserts 14 are formed from a plastics material such as polypropylene and the inserts are secured in the ends of the coupling body by ultrasonic welding. The inserts each have an internal frusto-conical cam surface 15 tapering towards the open end of the body and collets 16 are located in the inserts each having an annular portion 17 with an out turned flange 18 at its outer end outside the body and axially extending resilient fingers 19 projecting through the insert into the throughway. The resilient fingers 19 terminate in heads 20 having metal detents 21 embodied therein to engage and grip a tube extending through the collet into the coupling body. The heads 20 of the collet engage against the tapered cam surface 15 and if the tube in the collet is moved outwardly of the throughway, the action of the tapered cam surface on the heads causes the heads to grip and lock the tube in the collets. Adjacent the inserts 14, annular elements 22 are mounted in the coupling body each being formed with an external frusto-conical cam surface 23 spaced opposite the ends of the resilient fingers of the collets. By depressing the collets into the throughway, the ends of the fingers are engaged on the frusto-conical cam surfaces 23 and spread thereby to release the grip of the fingers from the tube. The coupling can then be readily thread in either direction along a tube. At the center of the throughway, four resilient arms 25 are molded integrally with the wall of the coupling body and extend inwardly and axially along the throughway a short distance towards one end thereof. The resilient arms 25 have radially extending end faces 26 to engage and form stops for a tube inserted into the coupling body from said one end. A tube inserted into the coupling from the other end engages the sides of the arms 26 and, when pressed into the coupling body will cause the arms to deflect outwardly allowing the tube to pass through the coupling body so that the coupling body can be threaded wholly on to a tube inserted from said other end of the body. As can be seen from the external view of the coupling body shown in FIG. 4, the arrow 27 on one end part of the coupling body depicts the end from which a tube can be inserted completely through the coupling body whereas the block 28 adjacent the other end indicates that a tube can only be inserted partially through the coupling body from that end.

FIGS. 5 and 6 illustrate the connection of a pair of tube lengths using a coupling in accordance with the invention. In FIG. 5, the coupling has been threaded wholly on to one of the tubes 30 and the other tube 31 is located in alignment with the tube 30 and in close proximity thereto. By depressing the collet at the left hand end of the coupling body into the coupling to release its fingers from the tube the coupling body can be slid along the tube. The collet at the right hand end of the tube will automatically be drawn into the coupling body and have its fingers engaged with the frusto-conical cam surface 23 to cause its fingers to release from the tube. The coupling is slid along the first tube and on to the second tube until the resilient arms at the center of the coupling body engage the end of the second tube and limit further movement. The arrangement is particularly applicable to the repair of a rigid tube in which it is necessary to cut out a damaged section and insert a corresponding new section. Once the damaged section has been removed, tube couplings can be threaded on to the ends of the tube and the new section located between the ends. The couplings can then be slid on to the ends of the new section coupling the new section in the existing tube.

I claim:

1. A tube coupling comprising a coupling body having a throughway open at opposite ends thereof to receive tubes to be coupled to the body and to enable a tube to pass through the body, two collets disposed in the respective ends of the coupling body through which tubes to be inserted in the body pass, the collets having resilient arms extending axially into the throughway to grip the respective tubes and the coupling body having internal frusto-conical cam surfaces adjacent said open ends and tapering towards the respective ends of the body to be engaged by the resilient arms of the collet with movement of the respective tubes outwardly of the coupling body to press the arms inwardly against the outer surfaces of tubes, and means in the throughway between said frusto-conical cam surfaces to limit the entry of a tube into the coupling body when inserted from one end thereof while permitting the tube to pass through the body when inserted from the other end.

2. A tube coupling as claimed in claim 1 wherein the stop means for limiting insertion of a tube in the coupling body from said one end are disposed midway along the throughway between the ends thereof.

3. A tube coupling as claimed in claim 2 wherein the stop means comprise at least one depressable resilient detent located in the throughway and shaped to engage and stop a tube passing along the throughway from said one end of the coupling body and to be depressed outwardly to permit a tube to pass along the throughway of the coupling body from said other end.

4. A tube coupling as claimed in claim 3 wherein the detent comprises at least one resilient arm extending from the wall of the throughway at an acute angle towards said one end of the throughway to engage an end of a tube inserting from that end of the coupling body to stop the tube in the body while permitting a tube inserted from the other end of the throughway to depress the arms outwardly to permit the tube to pass.

5. A tube coupling as claimed in claim 4 wherein four resilient arms are provided in the throughway at spaced locations around the throughway to provide said stop means.

6. A tube coupling as claimed in any of the preceding claims wherein means are provided adjacent the enlarged ends of the frusto-conical cam surfaces for engaging the free ends of the resilient arms of the collets when the collets are depressed into the ends of the coupling body to expand the ends of the collet to release the collets from a tube or tubes passing through the coupling body to facilitate sliding of the coupling body along a tube.

7. A tube coupling as claimed in claim 6 wherein said means comprise annular elements disposed in the throughway adjacent the frusto-conical cam surfaces and having further external frusto-conical cam surfaces thereon with which the ends of the arms of the collets are engagable to spread the arms.

8. A method of repairing a tube comprising cutting a damaged section of tube from a length of tube, preparing a new section of tube to replace the section of tube removed, sliding tube couplings in accordance with claim 1 wholly on to the ends of the existing tube, inserting the new section of tube between the ends of the existing tube and then sliding the tube couplings over the ends of the newly installed section until the stop means in the couplings limit further movement to couple the new section to the existing tube.

* * * * *